Jan. 5, 1943.  S. D. MURPHY  2,307,532
REVERSIBLE REAR VIEW MIRROR
Filed March 14, 1940
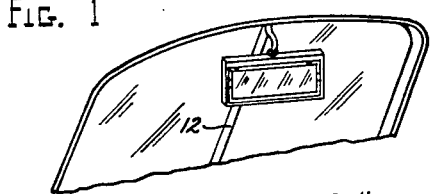
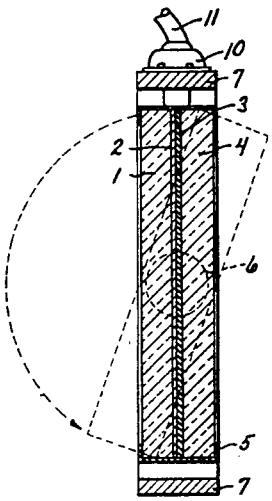
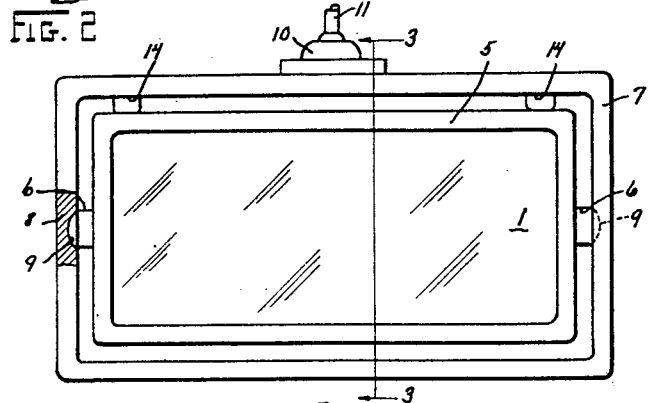
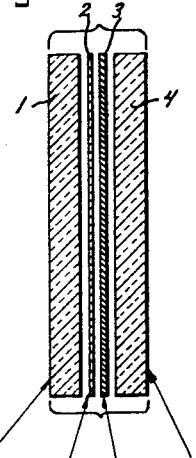
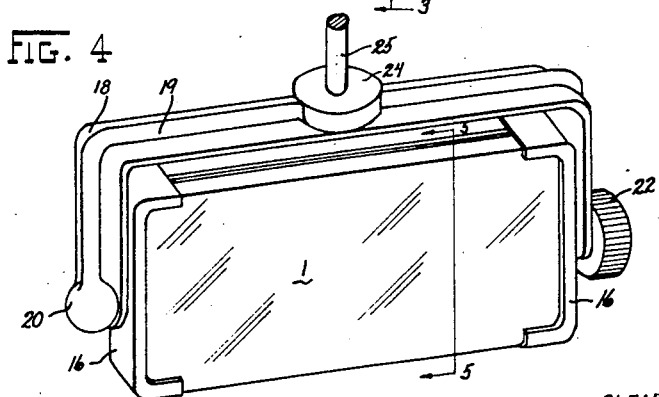
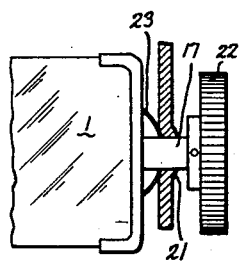
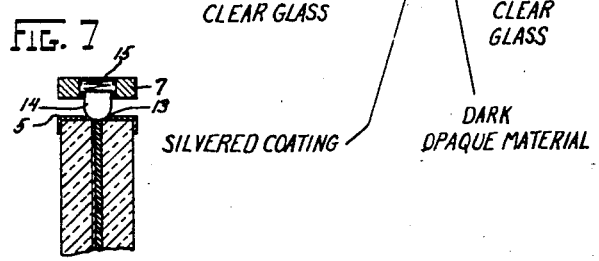
INVENTOR
SHIRLEY D. MURPHY
BY
Toulmin & Toulmin
ATTORNEYS Patented Jan. 5, 1943

2,307,532

UNITED STATES PATENT OFFICE 2,307,532

REVERSIBLE REAR VIEW MIRROR

Shirley D. Murphy, Indianapolis, Ind.

Application March 14, 1940, Serial No. 323,951

2 Claims. (Cl. 88—77)

The present invention relates to rear view mirrors for vehicles, and more particularly to anti-glare mirrors which may be used effectively for daylight and night driving.

When rear view mirrors of the ordinary type are placed in the line of sight between the eyes of the driver and the rear window, as employed for night as well as day driving, the headlights of a motor vehicle approaching from the rear may cause considerable glare at the rear view mirror. If the glare is excessive so as to interfere with the driver's eyes, it has been customary either to shift the mirror so as to change its direction of focus, or else to pull down the rear curtain. In either case the driver is deprived of a view to the rear which the mirror might normally have offered and this condition lasts until the mirror or the curtain has been restored to its initial position. This temporary deprivation of the rear view may be somewhat dangerous in that the driver can not completely follow the approach, or determine the position at which the oncoming auto vehicle may pass his own machine. It is also possible that other cars may be following the car in the rear so that while the mirror is effectively rendered inoperative the driver will not be apprised of all of the road conditions existing at the rear of his machine.

The primary object of the present invention is to provide an anti-glare rear view mirror which may be satisfactorily employed for day driving, and yet when used for night driving will completely eliminate the glare of bright headlights approaching from the rear while still permitting a full field of view through the rear window of the vehicle.

Still further objects are to provide an improved rear view mirror for vehicles which has a selective reflective property depending on the intensity of the impinging light from the rear; to provide a rear view mirror which reflects light below a predetermined intensity greater than light above a predetermined intensity.

A final object is to provide a mirror of the character referred to which is simple to construct, made of relatively inexpensive parts and one in which the glass surfaces can be readily cleaned and moisture removed therefrom when necessary.

These objects are attained in brief by providing a mirror constituted of a pair of glass plates arranged back to back with a mirror of high reflective power interposed between the plates, the direction of reflection extending through only one of the plates. The mirror is adapted to be rotated on an axis passing through the reflective layer and is adjustably held in line with the driver's sight. Thus, one of the glass plates has a greater reflecting property than the other glass plate and arranged so that the element of the greater reflecting power may be used for daytime driving and this element is replaced by the other element of less reflecting power for night time driving.

The invention will be better understood when reference is made to the following description and the accompanying drawing.

In the drawing:

Figure 1 represents a view looking forward through the windshield of an automobile and showing the improved mirror in place.

Figure 2 is an elevational view of the mirror mounted within a frame for rotation.

Figure 3 is a cross sectional view, somewhat enlarged, taken along line 3—3 in Figure 2 and looking in the direction of the arrows.

Figure 4 is a perspective view of a modified form of the improved mirror and its frame.

Figure 5 is an enlarged sectional view taken along line 5—5 in Figure 4.

Figure 6 is a detailed fragmentary view, somewhat enlarged, of the friction adjustment mechanism shown to the right in Figure 4.

Figure 7 is a fragmentary sectional view of the spring latch mechanism for holding the mirror in a desired predetermined position.

The principle on which the present invention is based is, that when a beam of light falls upon a sheet of glass which is provided with a mirror backing, that light is reflected with little or no diminution toward the eye of an observer at an angle of reflection equal to the angle of the incidence. On the other hand when the same beam of light impinges on a highly polished sheet of glass without a mirror backing, the amount of light reflected therefrom toward the observer is only a fractional part of light which would be reflected had the plate glass been provided with a mirror backing. It has been further found that if the glass plate has applied thereto an opaque backing of dark material (i. e., without a silvered coating) the opposite side of the glass plate will provide greater reflective effects than if the backing were of a lighter material. This increase in reflection brought about by the dark material backing does not permit glare and yet it will give sufficient reflection to enable the driver looking at the glass plate to receive an image, not only of the headlights of an approaching car, but also the outline image of the car itself. The arrangement which will be described presently is such that the plate glass provided with the mirror is employed for day driving since there is no opportunity for glare whereas the glass plate without the mirror and provided with a dark backing is employed for night driving, to cut down the glare.

The substitution of one type of mirror for the other, depending on the conditions of driving are brought about in a novel manner which facilitates the change in mirrors and that mirror which is being employed for the moment remains properly focused with respect to the driver's eye and the rear window of the machine.

Referring more particularly to Figures 1 to 3, numeral 1 designates a highly polished plain sheet of glass provided at the rear side with a silvered, or other highly reflective coating which may be applied thereto in any suitable and well known manner. In order to protect the coating and for another purpose which will be disclosed presently, there is applied to the coating a thin layer 3 of felt or other opaque material, preferably of a dark color and secured to the silvered coating by an adhesive or in any other suitable manner. Facing the felt layer there is a second highly polished plain sheet of glass 4 and this sheet may be secured, if desired, to the felt layer 3 so that the two sheets of glass are effectively joined together.

The entire glass assembly which is preferably of a rectangular configuration is mounted in a thin metal frame 5 preferably having a U-shaped cross section so as to provide a narrow border around the outside face of the glass sheets 1, 4 and also to assist in securing these sheets together. It is obvious, that if desired, this frame may constitute the sole securing means between the two glass sheets. The frame 5 is provided at two of its opposite sides, preferably the sides of shorter length, with bearings for a pair of pivot rods 6. These rods may be soldered to the frame 5 and the axis of the rod is preferably located at the joint between the two glass elements and approximately halfway along the sides of the elements, as is indicated in Figure 3.

Surrounding the metal frame 5 there is another frame of metal 7, made slightly heavier than frame 5 and the surrounding frame likewise is preferably of rectangular configuration. While the frame 7 may have a U-shaped cross section similar to the frame 5, in order to provide lightness consistent with strength, I have shown the frame 7 as being constructed of solid section as indicated at 8. The frame 7 is provided with a pair of relatively shallow countersunk holes indicated at 9 which are so positioned as to receive the rounded ends of the pivot rods 6, thus reducing wear as the rods 6 rotate. The frame 7 is provided at its upper side member 10 with a universal swivel of any suitable or well known design which terminates in a rod 11 for securing the mirror to the dividing partition indicated at 12 of an automobile windshield directly in front and to the right of the driver.

It is evident that by applying pressure to the upper or lower side of the frame 5, the mirror can be caused to rotate on the rods 6 so as to present either glass sheet 1 or glass sheet 4 to the eye of the driver. The position of the mirror as a whole is adjusted at the swivel joint 10 so that when the plane of the frame 5 coincides with the plane of the frame 7 and assuming that the glass plate 1 is nearer the driver, the latter can view the roadway through his rear window as reflected by the mirror. In order that plate glass 1 may be quickly placed in position after having made the proper adjustment at the swivel joint 10, there is provided a pair of spring latch members which extend down from the upper side of the frame 7 and project into shallow concave openings indicated at 13 in Figure 7. These latch elements comprise a short stud 14, terminating in a hemispherical portion and at the other end abuts a compression spring 15 which is secured within an opening in the frame. Thus after the frame 5 is brought into parallel alignment with the frame 7 the rod 14 is urged downward by the spring 15 detachably to latch the frame 5 in position.

It is apparent that when the improved mirror is employed for day driving the plate glass element 1 is positioned nearer the observer or driver and the image of an approaching machine from the rear is transmitted through the rear window and through the glass element 1 on to the mirror 2 which reflects the light image to the driver's eye. On the other hand, for night driving, it is only necessary to press the frame 5 at its upper or lower edge, causing the rod 14 to be withdrawn from the opening 13 and after swinging the mirror through 180° as indicated in Figure 3, the opposite edge of the frame 5 is caused to be latched in place by the rods 14. In this case the plate glass element 4 is now presented to the driver. Inasmuch as this glass is of a highly polished character and assuming that there has been no change made in the position of the mirror as a whole at the swivel 10, the driver will be able to observe quite distinctly, but without glare, the headlights of any automobile approaching from the rear. The reflective power of an ordinary highly polished sheet of glass is only a fraction of that obtained from an ordinary mirror, for example, from 5 to 10% so that the lights emanated by the approaching headlights is reduced in a corresponding degree, thus eliminating glare.

In order to increase the distinctness with which the image of the approaching car may be observed without introducing glare, there is provided a material 3 of dark color between the silvered coating 2 and the glass element 4. The presence of this dark material has been found to increase the reflective power of a plain highly polished sheet of glass to such an extent that the outline of the approaching automobile and its lights may be discerned without glare effects. Thus the driver has a clear and distinct view of the roadway to the rear. It will be understood that if desired, the dark material 3 may be replaced by lighter material, or indeed the rear side of the mirror coating 2 may be painted white in order to cut down even the small reflective power of the plain sheet of glass 4.

In Figures 4, 5 and 6 there is shown a modification of the improved day and night mirror. As shown more particularly in Figure 4, only the ends of the glass unit are provided with a metal frame 16. These frames may have both a U-shaped cross section and a U-shaped configuration as a whole so as to embrace the short sides of the glass unit to which they are held preferably by means of an adhesive. As in the case of the mirror shown in Figure 2, the frame 16 will likewise be provided with outwardly extending rods 17, preferably positioned at the joint between the two glass members and midway between the upper and lower sides of the glass unit. Extending along the entire length of the upper side of the unit and halfway down on each side thereto, there is a metal frame 18 provided with a central bead 19 which terminates in a hemispherical portion 20 and contains an opening for receiving one of the rods 17. The other end of the frame 18 is provided with a dished-out portion 21 (Figure 6) having an opening which receives the other of the rods 17. A knurled knob 22 is secured to the rod or shaft 17 and there is a spring washer 23 positioned between the inside surface of the frame and the adjacent surface of the frame 16, as indicated in Figure 6. The purpose of the spring washer 23 is to introduce friction in the shaft 17 so that the knob 22 can be turned only with difficulty. The spring washer therefore maintains the glass unit in position until the knob is turned to cause the unit to assume a different position.

The glass unit shown in Figures 4, 5 and 6 is similar to that described in connection with Figure 3 except that in Figure 5, the mirror coating 2 has been illustrated as being separate from the opaque material backing 3. However, it will be understood that the glass elements 1 and 4 abut the material 3 and are all secured together in any suitable well known manner to form a rigid unit. It is apparent that for daylight driving the knob 22 is rotated until the glass element 1 is positioned nearer the driver so that he can observe to the rear of his machine through the mirror. When night time arrives, the driver again moves the knob 22 until the glass unit has been rotated approximately 180° from its previous position, causing the glass element 4 to be placed nearer the driver. Thus for daylight driving the mirror coating 2 reflects the rear image whereas after the unit has been rotated, the reflection is decreased due to the lower reflective power of the glass element 4 which does not have a mirror background but is simply provided with opaque non-reflective material 3.

Inasmuch as the knob 22 can accurately position the glass 1 and 4 with respect to the driver's eye, there is no need for providing a universal joint on the frame 18. It is sufficient to provide only a bearing 24 which is adapted to rotate on a vertical rod 25 secured to any convenient portion of the automobile.

From the foregoing it is evident that I have provided an improved rear view mirror which has a selective reflective effect depending on the relative positions of the mirror unit as a whole and which positions are altered by rotating the unit along a horizontal axis, thus successively presenting to the driver mirrors of high and low reflective power, depending on the conditions of driving.

It is apparent that the mirror in its entirety is simple to construct, is quite inexpensive and there is no problem of keeping the glass surfaces clean as the glass can be readily wiped off and the possibility of any double-image is absolutely eliminated.

In the case of the structure shown in Figure 2 in which the glass is contained in a metal frame which extends all around the unit, there is no need for beveling the edges of the glass and this also tends to reduce cost.

It will be understood that I desire to comprehend within my invention such modifications as come within the scope of claims and my invention.

Having thus fully described my invention, what I claim as new and desire to secure by Letters Patent is:

1. A rear view mirror comprising a sheet of glass having one side coated with silvering material and an opaque backing, a second sheet of glass secured to said backing, a frame surrounding all of the edges of said sheets of glass, said frame being pivotally mounted in a second frame on an axis passing through opposite edges of the mirror, said second frame surrounding all of the edges of said other frame, means for supporting the second frame in front of the driver of a vehicle and means comprising a pair of spring latch members extending between the sides of the frames free of said pivotal mounting, spaced apart from each other a substantial distance and located near the extremities of the inner frame for detachably holding the two frames in parallel alignment.

2. A rear view mirror comprising a sheet of glass having one side coated with silvering material, an opaque backing, a second sheet of glass secured to said backing, a frame surrounding all of the edges of said sheets of glass, said frame being pivotally mounted in a second frame on an axis passing through opposite edges of the mirror, said second frame surrounding all of the edges of said first-mentioned frame, means for supporting the second frame in front of the driver, and means comprising a spring latch member interposed between said frames at that side of the frame which is free of said pivotal mounting for detachably holding the two frames in parallel alignment.

SHIRLEY D. MURPHY.